United States Patent Office.

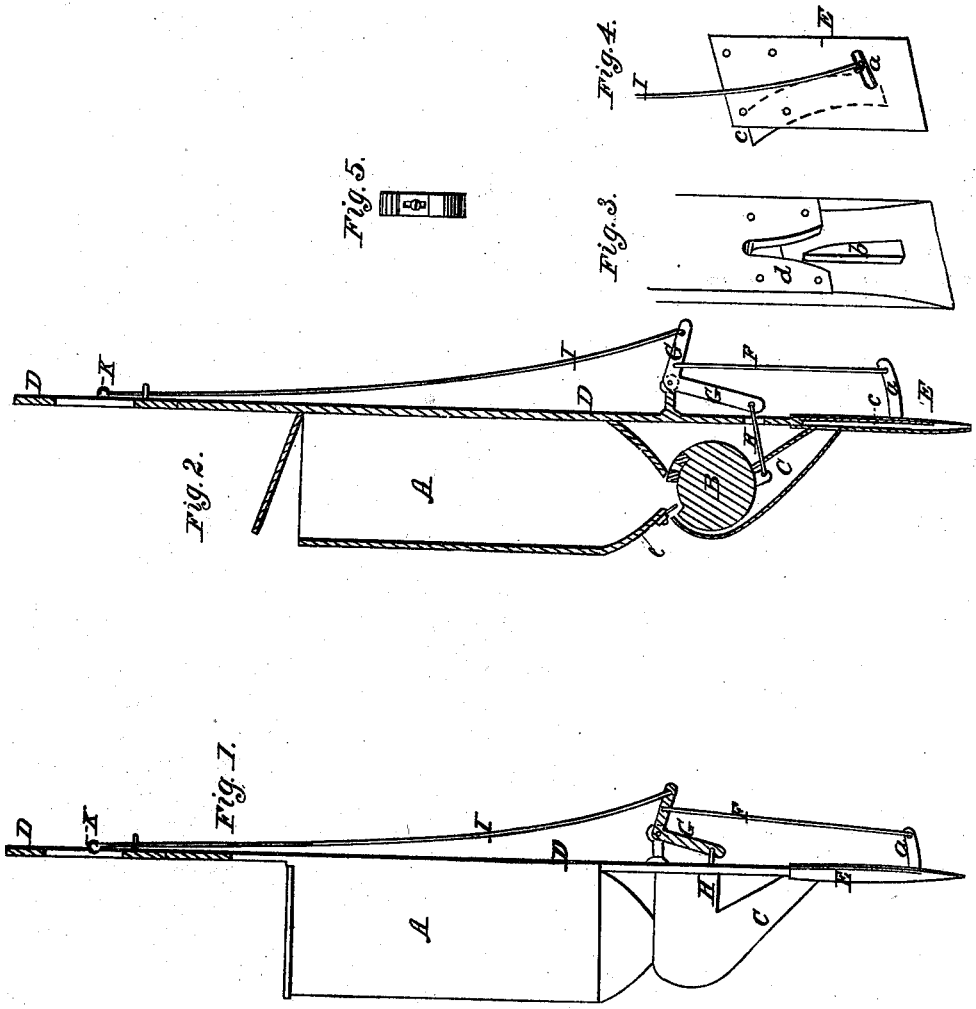

LOYAL M. DODDRIDGE, HENRY REITENOUR, AND JACOB B. SWHIER, OF NEW MOUNT PLEASANT, INDIANA.

Letters Patent No. 89,742, dated May 4, 1869.

IMPROVEMENT IN CORN-DROPPER.

The Schedule referred to in these Letters Patent and making part of the same.

*To all whom it may concern:*

Be it known that we, LOYAL M. DODDRIDGE, HENRY REITENOUR, and JACOB B. SWHIER, of New Mount Pleasant, in the county of Jay, and State of Indiana, have invented a new and useful Improvement in Corn-Droppers; and we do hereby declare that the following is a full, clear, and exact description of the same, reference being had to the annexed drawings, making part of this specification, in which—

Figure 1 is a side elevation of our improved device;

Figure 2, a vertical central section of the same, showing the arrangement of the parts;

Figure 3, a perspective view, showing the construction of the lower end of the main bar of the device, with the aperture through which the grain passes, and also the device for spreading such grain as it passes such aperture; and Figure 4, a perspective view, showing the spring and spring-plate, which are attached to the lower end of the device, and control the final delivery of the grain.

Corresponding letters refer to corresponding parts in the several figures.

This invention relates to an improvement in that class of machines denominated hand corn-droppers; and It consists in the combination and arrangement of the parts of which it is composed.

A, in the drawings, represents the seed-box, which is secured to the vertical bar D, and which is provided with a cover, as shown in fig. 2. This box is contracted at its lower end and upon all of its sides, so as to form a discharge-aperture, at the centre thereof, for the discharge of the corn into cylinder B.

B represents a cylinder, which is provided with a recess, or cavity, in its periphery, for the reception of a given number of kernels of corn, such cavity being made of the proper dimensions to receive the requisite number of kernels to be dropped in each hill, or said cavity may be of larger dimensions, and so arranged as only to open to the seed-box sufficiently to receive the requisite number of seed, as shown at Figure 5. This cylinder is arranged within the discharge-aperture C, directly underneath the opening in the seed-box A, so as to receive the seeds from the latter and deliver them into the former.

C represents the delivery-tube. It is constructed of metal or of wood, and is of the form shown in fig. 1, or of any other suitable form, and is so arranged as to receive the grain from cylinder B, and conduct it to the distributer *b*, in the lower end of D, shown in fig. 3.

D represents the plate or frame of the machine, to which the other parts are secured. This plate or frame is provided, at its upper end, with a handle, which is adapted to the hand of the operator, and is used in moving and operating the machine. To the lower end of this plate there is attached a plate of metal, which extends for some distance below the lower end thereof, and which is sharpened at its lower end, for the purpose of facilitating its entrance into the earth. Just at that point where the grain passes through this plate or frame from the discharge-aperture C, there is formed an A-shaped projection, as at *d* in fig. 3, which projection is designed as a further distributer, or spreader of the grain, so that as it passes down the apertures formed upon either side of this projection, the same shall be properly spread in the hill.

E represents a spring-plate, which is secured to the frame D, or to the plate upon the lower end thereof, and is so arranged that its lower end comes in contact with such plate or frame, and enters the earth therewith.

To the back or inside of this spring-plate, there is secured a spring, as shown at *c* in fig. 4, which operates to keep the lower end of said plate in contact with the frame D, or the plate attached thereto, as above described, and also to return the other parts to their original positions, after they have been turned or moved for the purpose of dropping the grain.

F represents a connecting-rod, which extends from an arm, *a*, which is secured to the plate E, up to the crank G, for the purpose of communicating the motion of such crank to said arm and spring-plate.

G represents a bell-crank, which is secured to a stud upon the back side of frame or plate D. To the lower arm of this crank is attached the connecting-rod H, which extends therefrom to the cylinder B, while to its upper arms is attached the rod I.

H represents a rod, which connects crank G with cylinder B, to which it is attached in such manner, that when the other arm of said crank is raised, the cylinder will be rotated sufficiently to allow any seed which may be deposited in the cavity formed therein to be delivered into conductor C.

I represents a rod, which extends from the handle upon the upper end of frame or plate D, to, and connects with crank G.

K represents a handle upon the upper end of rod I.

It will be observed that the arrangement of the above-described parts is such that if the hand of the operator is placed within the handle, the instrument may be thrust into the earth at any point where he may desire to drop or plant a hill.

It will be apparent that the above-described operation will leave a cavity which will be suitable for the reception of the seeds; and also that if the operator, when about to withdraw the instrument from such cavity, seizes the handle upon rod I, and pulls it upward, the cylinder B will be turned so as to allow the grain in its cavity to pass down into the earth, and at the same time the spring-plate will be forced outward, and thus the seed will be properly adjusted in the ground at any depth which may be desirable.

Having thus described our invention,

What we claim, and desire to secure by Letters Patent, is—

1. The combination of the cylinder B, crank G, seed-box A, and delivery-passage C, substantially as shown and described.

2. The combination of the seed-scatterer *b*, spring *c*, spring-plate E, and plate or frame D, substantially as and for the purpose set forth.

3. The combination of the spring-plate E, spring *o*, and frame or plate D, substantially as and for the purpose set forth.

4. The arrangement of the spring-plate E, spring *c*, bell-crank G, rods H and F, with reference to cylinder B, for the purpose of moving the same, substantially as shown and described.

In testimony whereof, we have signed our names to this specification, in the presence of two subscribing witnesses.

LOYAL M. DODDRIDGE.
HENRY REITENOUR.
JACOB B. SWHIER.

Witnesses:
JAMES N. TEMPLER,
JEREMIAH L. MANLEY.